United States Patent
Edwards et al.

(10) Patent No.: US 8,989,776 B2
(45) Date of Patent: Mar. 24, 2015

(54) LOCATION AGGREGATION SYSTEM

(71) Applicants: Michael J. Edwards, Plainfield, IL (US); Todd C. Morgan, Oak Park, IL (US); Sandra L. True, St. Charles, IL (US)

(72) Inventors: Michael J. Edwards, Plainfield, IL (US); Todd C. Morgan, Oak Park, IL (US); Sandra L. True, St. Charles, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 92 days.

(21) Appl. No.: 13/848,777

(22) Filed: Mar. 22, 2013

(65) Prior Publication Data

US 2014/0287745 A1    Sep. 25, 2014

(51) Int. Cl.
  H04W 24/00   (2009.01)
  H04W 60/00   (2009.01)
  H04W 8/04    (2009.01)
  H04W 64/00   (2009.01)

(52) U.S. Cl.
  CPC ............... *H04W 60/00* (2013.01); *H04W 8/04* (2013.01); *H04W 64/00* (2013.01)
  USPC ....................... 455/456.1; 455/433

(58) Field of Classification Search
  CPC ....... H04W 4/025; H04W 4/04; H04W 24/08; H04W 28/08; H04W 40/00; H04W 40/02; H04W 4/16; H04W 4/24; H04W 12/06
  USPC ............................ 455/433, 435.1, 456.1, 445
  See application file for complete search history.

(56) References Cited

U.S. PATENT DOCUMENTS

| | | | | |
|---|---|---|---|---|
| 5,490,201 A * | 2/1996 | Moberg et al. | ............... | 455/433 |
| 5,713,073 A * | 1/1998 | Warsta | .......... | 455/524 |
| 6,169,899 B1 * | 1/2001 | Havinis et al. | ............... | 455/433 |
| 6,272,342 B1 * | 8/2001 | Havinis et al. | ............... | 455/433 |
| 7,127,246 B1 * | 10/2006 | Muhonen | .................... | 455/433 |
| 7,942,319 B2 | 5/2011 | Bezancon | | |
| 7,974,637 B1 * | 7/2011 | Taveniku | .................. | 455/456.1 |
| 2003/0060215 A1 * | 3/2003 | Graham | ....................... | 455/456 |
| 2004/0185871 A1 * | 9/2004 | Somani et al. | ............. | 455/456.1 |
| 2007/0238466 A1 * | 10/2007 | Buckley et al. | ............... | 455/445 |
| 2008/0293412 A1 * | 11/2008 | Grahn et al. | ............... | 455/435.1 |
| 2009/0137222 A1 * | 5/2009 | Heen | .......................... | 455/404.1 |
| 2009/0184867 A1 * | 7/2009 | Lee | ......................... | 342/357.03 |
| 2012/0023022 A1 * | 1/2012 | Carroll et al. | ..................... | 705/44 |
| 2012/0089993 A1 * | 4/2012 | Alonso Alarcon et al. | ... | 719/318 |
| 2012/0214510 A1 * | 8/2012 | Brisebois | .................. | 455/456.1 |
| 2013/0196656 A1 * | 8/2013 | Liu | ................................ | 455/433 |
| 2013/0295924 A1 * | 11/2013 | Sutherns et al. | .............. | 455/433 |

* cited by examiner

*Primary Examiner* — Nathan Taylor
(74) *Attorney, Agent, or Firm* — Carmen Patti Law Group, LLC (57) ABSTRACT

Exemplary methods and apparatuses are provided that address how to turn visitor location register location data from telecommunications networks into information that can be aggregated across network switches, accessed by a direct query mechanism or via application programming interfaces, and reported upon from a single point of entry without affecting the performance or capacity of the network switches. Specifically, a Location Aggregation Server is provided that is configured to aggregate mobile terminal location data across multiple visitor location registers and to populate a database with the location information, e.g., an identifier of the mobile terminal and an identifier of a new location of the mobile terminal. Service providers and third parties may be able to search the database, display mobile terminal location data on a map, or aggregate the mobile terminal location data into meaningful statistics.

22 Claims, 6 Drawing Sheets

LOC CHG Record 200

| Data Field | Data Element |
|---|---|
| Mobile Terminal Identifier | a model number, an International Mobile station Equipment Identity and Software Version (IMEISV) number, IMSI, a brand name, etc |
| Location Identifier | a VLR address, a MacroCell identity, global positioning system coordinates, a service area identifier, location area code, Public Land Mobile Network ID, E-utran Cell ID, etc. |
| Time Stamp of when the mobile terminal location change occurred | Milliseconds, Seconds, Minutes, Hour, Date |
| Access Technology associated with the new location | second generation (2G) technology, third generation (3G) technology, long term evolution/ fourth generation technology (LTE/4G), or any combination thereof |
| Activity type - how was data obtained | Mobile Origination, a Mobile Termination, a Page Response, a Location Services Query, Any Time Interrogation, etc. |
| UE Status | Detached, Idle, Busy |
| VLR Status | Active, Suspended |
| Last Activity Time | Milliseconds, Seconds, Minutes, Hour, Date |
| Short Message Service (SMS) Subscription Flag | |
| Location Services Query Capabilities | indicates willingness to share location information |

FIG. 1

LOC CHG Record 200

| Data Field | Data Element |
|---|---|
| Mobile Terminal Identifier | a model number, an International Mobile station Equipment Identity and Software Version (IMEISV) number, IMSI, a brand name, etc |
| Location Identifier | a VLR address, a MacroCell identity, global positioning system coordinates, a service area identifier, location area code, Public Land Mobile Network ID, E-utran Cell ID, etc. |
| Time Stamp of when the mobile terminal location change occurred | Milliseconds, Seconds, Minutes, Hour, Date |
| Access Technology associated with the new location | second generation (2G) technology, third generation (3G) technology, long term evolution/ fourth generation technology (LTE/4G), or any combination thereof |
| Activity type - how was data obtained | Mobile Origination, a Mobile Termination, a Page Response, a Location Services Query, Any Time Interrogation, etc. |
| UE Status | Detached, Idle, Busy |
| VLR Status | Active, Suspended |
| Last Activity Time | Milliseconds, Seconds, Minutes, Hour, Date |
| Short Message Service (SMS) Subscription Flag | |
| Location Services Query Capabilities | indicates willingness to share location information |

LOCATION AGGREGATION SYSTEM

TECHNICAL FIELD

This invention relates to the art of telecommunication systems, and more particularly to the aggregation of mobile terminal location information across multiple network switches via network servers.

BACKGROUND

Visitor location registers (VLRs) track mobile terminals currently receiving telecommunications service in a serving coverage area of their respective mobile switches, which is different from the home serving area of the mobile terminal subscriber. Real-time access to data contained in the VLRs (e.g., the mobile terminal's location) has the potential to create a new stream of revenue for service providers. Service providers, network operations teams, and third party marketing departments could use mobile terminal location information aggregated across multiple areas to make important decisions related to network operations (e.g., network capacity planning) and marketing activities (e.g., targeted advertising).

Disadvantageously, the ability to quickly identify how many mobile terminals users are in a particular location at a specific time is not the kind of information that is readily available. Also disadvantageously, the ability to determine how many mobile terminals users were in a particular location area over a specified period of time is not possible currently. Further disadvantageously, contacting all mobile terminals or a specific set of mobile terminals in a specific location via a Short Message Service (SMS) message is also not possible, unless the user of the mobile terminal currently opts into a network application service and continually provides its location to the associated application server, which adds more load onto the network as well as drains the mobile terminal's battery.

SUMMARY

Apparatuses and methods are provided for a Location Aggregation System. Embodiments are provided that may assist network providers to turn visitor location register location data from telecommunications networks into information that can be aggregated across network switches.

More specifically, in one embodiment, provided is a method that includes receiving an indication that a location of a mobile terminal has changed in a visitor location register; creating, from information stored at the visitor location register, a record that comprises an identifier of the mobile terminal and an identifier of a new location of the mobile terminal; and transmitting the record in a message to a server.

In another embodiment, a method is provided that includes receiving a message from a switch via a network connection; and populating a database with data from the message; wherein the data comprises a record created from information stored at a visitor location register associated with the switch, and wherein the record describes a location of a mobile terminal that has changed in the visitor location register.

In another embodiment, a server includes a receiver configured to receive a message from a switch via a network connection; and a processor connected to the receiver, the processor being configured to populate a database with data from the message; wherein the data comprises a record created from information stored at a visitor location register associated with the switch, and wherein the record describes a location of a mobile terminal that has changed in the visitor location register.

DESCRIPTION OF THE DRAWINGS

Some embodiments of apparatuses and methods in accordance with embodiments of the present invention are now described, by way of example only, and with reference to the accompanying drawings, in which.

DETAILED DESCRIPTION

Embodiments are provided that address how to turn visitor location register (VLR) location data from telecommunications networks into information that can be aggregated across network switches, accessed by a direct query mechanism or via application programming interfaces, and reported upon from a single point of entry with minimal impact to the performance or capacity of the network switches.

Figure 1:
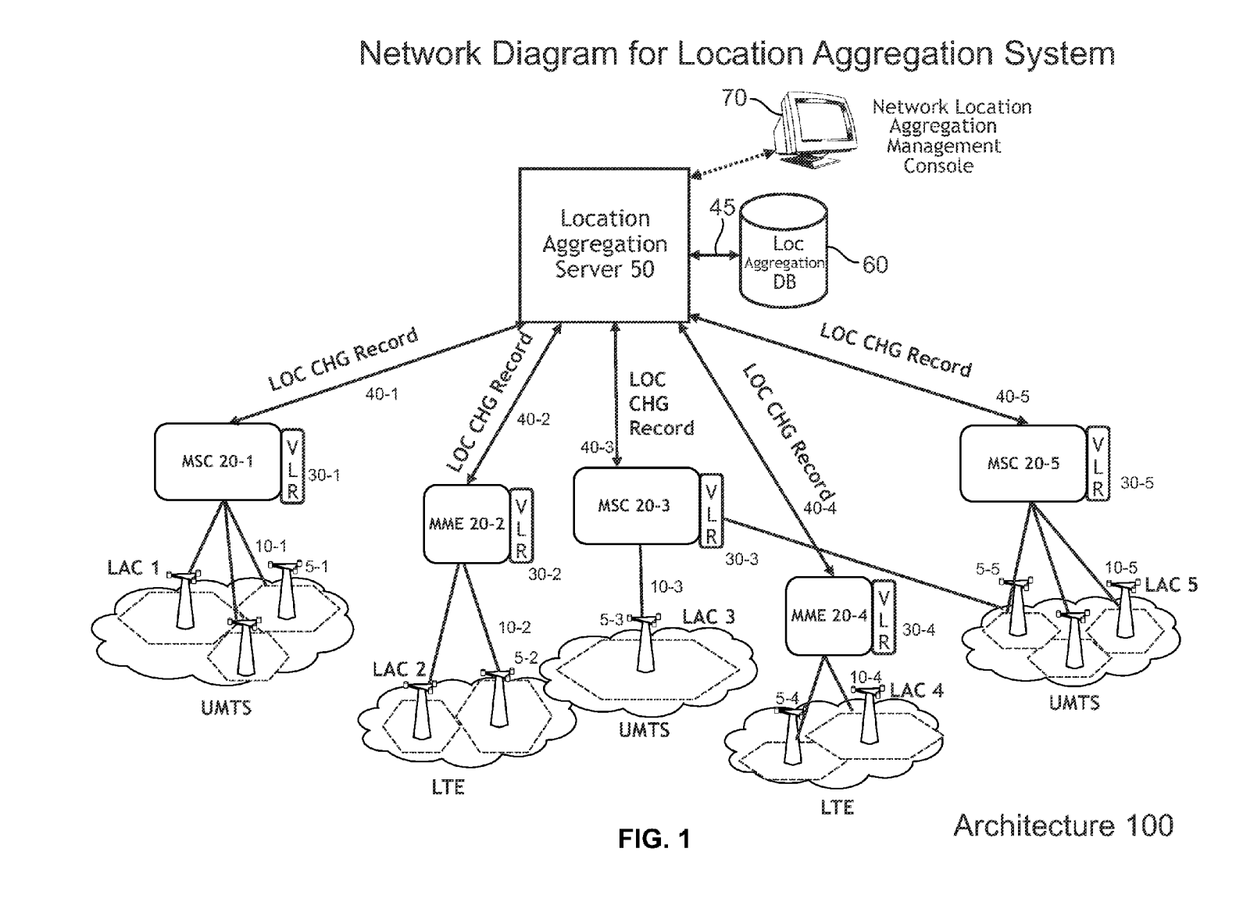
FIG. 1 shows an illustrative embodiment of an exemplary network connected to a Location Aggregation System arranged in accordance with the principles of the invention.

FIG. 1 shows an illustrative embodiment of an exemplary network connected to a Location Aggregation System (LAS) arranged in accordance with the principles of the invention. As shown in FIG. 1, architecture 100 includes LAS 50 which connects to switches 20-1 to 20-5 (collectively hereinafter referred to as switches 20) over links 40-1 to 40-5 (collectively hereinafter referred to as links 40). Links 40 may comprise landline or wireless physical media.

In one embodiment, LAS 50 is an application server that houses all of the functionality for aggregating mobile terminal location information contained in multiple VLRs over time and over multiple networks. LAS 50 will maintain the location of all mobile terminals through new service logic produced during standard mobility management procedures. After aggregating the mobile terminal location information, LAS 50 is configured to store the information in Location Aggregation Database 60. A more detailed explanation of the functions of LAS 50 and Location Aggregation Database 60 is provided in the illustrative embodiments herein below. Although only one Location Aggregation System 50 is shown in FIG. 1, there may be multiple Location Aggregation Systems which connect to a plurality of switches, which connect to a plurality of radio access networks. FIG. 1 is shown as representative of a portion of a telecommunications network in order to simplify the description of the present invention, while still presenting the subject matter so that it may be completely understood by one of ordinary skill in the art.

Switches 20 perform communication session set up and tear down and convey calls or messages between a plurality of endpoints (e.g., calls from mobile devices to other mobile devices). Switches 20 may have call control components, not shown, that monitor all mobile terminal (i.e., a mobile or handheld device that incorporates wireless voice communication capability as a standard function) calls within their serving area, arranges handoffs between switches, keeps track of billing information, etc. In one embodiment, switches 20 may comprise a mobile switching center (e.g., MSC 20-1, MSC 20-3 and MSC 20-5) that serves a Universal Mobile Telecommunications System (UMTS) network (e.g., location area code 1 (LAC 1), LAC 3 and LAC 5). In another embodiment, switches 20 may comprise a Mobility Management Entity (e.g., MME 20-2 and MME 20-4) that serves a Long Term Evolution (LTE)/Evolved UMTS Terrestrial Radio Access Network (E-UTRAN) network (e.g., LAC 2 and LAC 4). In yet another embodiment, not shown, switches 20 may comprise Serving General Packet Radio Service Support Nodes that serve a Global System for Mobile Communications (GSM) network. The functions of telecommunication switches are well known in the art, and will not be described in detail.

Each of switches 20 are associated with their own VLR (i.e., VLRs 30-1 to 30-5, collectively hereinafter referred to as VLRs 30). In one illustrative embodiment, each of switches 20 is integrated with their own VLR (e.g., switches 20-1 are integrated with VLR 30-1 and switches 20-2 are integrated with VLR 30-2, etc). In another embodiment, not shown, the VLR may be very tightly linked with the switch via a proprietary interface. VLRs 30 are databases that contain information about the subscribers roaming within a location area of switches 20. Whenever a mobile terminal enters an area served by VLRs 30 and registers there, VLRs 30 inform the subscriber's home location register (HLR), not shown, of the change in the mobile terminal's location. The HLR downloads the service profile (i.e., a record of the subscriber name, telephone number, address, account status and telephone features subscribed to) of the roaming subscriber as well as other information necessary for call termination at the mobile terminal to VLRs 30. VLRs 30 monitor the mobile terminal's location while the mobile terminal is within the coverage area of VLRs 30. Illustratively, VLR 30-1 monitors a mobile terminal's location while the mobile terminal is within LAC-1 and VLR 30-2 monitors a mobile terminal's location while the mobile terminal is within LAC-2. A subscriber' mobile terminal cannot be present in more than one VLR at a time.

Also, each of switches 20 are connected to one or more radio transmitters/receivers and controllers (i.e., radio transmitters/receivers 5-1 to 5-5, collectively hereinafter referred to as radio transmitters/receivers 5) that provide bi-directional wireless connectivity for wireless communication devices (e.g., "pocket" mobile phones, mobile telephones installed in an engine-driven vehicle, smart phones, personal digital assistance (PDA) devices, a digital video camera that can access the Internet, two-way pagers, notebook computers, wireless portable media players that allow an addition of executable programs, or other portable devices with the capability to connect and interact with a wireless network) within a geographical area, or a cell. A cell is a basic geographic unit of a cellular system, and radio transmitters/receivers 5 may be positioned at or near the center of a cell in one of LAC 1 through LAC 5. Illustratively, radio transmitters/receivers 5-1 are centrally situated within a cell of LAC 1 and radio transmitters/receivers 5-2 are centrally situated within a cell of LAC 2. Architecture 100 may include a much larger number of cells in actual practice, but a small number of cells is depicted in FIG. 1 for the sake of simplicity. In one illustrative embodiment, radio transmitters/receivers 5 comprise base stations in a UMTS network (e.g., radio transmitters/receivers 5-1, radio transmitters/receivers 5-3 and radio transmitters/receivers 5-5). In another illustrative embodiment, radio transmitters/receivers 5 comprise access network edge devices in a LTE network (e.g., radio transmitters/receivers 5-2 and radio transmitters/receivers 5-4).

Radio transmitters/receivers 5 comprise a radio access network and switches 20 comprise a core network. The connections (i.e., links 10-1 to 10-5 collectively hereinafter referred to as links 10) between radio transmitters/receivers 5 and switches 20 may encompass optical links, wireless links, packet switched channels, direct communication channels, microwave, Ethernet or any combination thereof depending on the needed capacity and expense.

For purposes of illustration and example, every time a mobile terminal's location is changed in VLRs 30 (e.g., a movement of the mobile terminal denoted by a change in the cell identity (cell ID) or Service Area Code identity (SAC ID) in UMTS and a change in the E-utran Cell Global Identifier (E-CGI) in LTE), switches 20 may be configured to execute new service logic to generate a message that contains a Location Change Record (LOC CHG Record). The LOC CHG Record is created from mobile terminal location data stored in VLRs 30 and includes an identifier of the mobile terminal and an identifier of the new location of the mobile terminal. Illustratively, MSC 20-1 may have one or more processors, not shown, that execute program logic to generate a message that contains the LOC CHG Record every time the mobile terminal's location is changed in VLR 30-1 as a result of MSC 20-1 receiving an indicator such as a Mobile Origination message, a Mobile Termination message, a Page Response, a Location Services Query, a Location Update message, or a Call Independent Supplementary Service (CISS) procedure. Also illustratively, MME 20-2 may have one or more processors, not shown, that execute program logic to generate a message that contains the LOC CHG Record every time the mobile terminal's location is changed in VLR 30-2 as a result of MME 20-2 receiving an indicator such as a Mobile Attach/Detach message, a Mobile Origination message, a Mobile Termination message, a Tracking Area Update message, a Page Response, or a SMS origination/termination message. In another illustrative embodiment, VLRs 30 may package the information that comprises the LOC CHG Records into a proprietary message to be sent to LAS 50 when VLRs 30 is updated for a mobile terminal with a new location.

The frequency in which the message that contains the LOC CHG Records is sent to LAS 50 may be a parameter that is adjustable by a service provider. In one illustrative embodiment, after creating the LOC CHG Record, switches 20 may be configured to send one or more LOC CHG Records associated with the location change of one or more mobile terminals to LAS 50 in real-time (i.e., immediately). In another illustrative embodiment, switches 20 may be configured to send the one or more LOC CHG Records to LAS 50 in a batch process (i.e., in predetermined intervals such as every 15 minutes) as provisioned by a service provider. This predetermined interval or waiting time provides switches 20 with more time to aggregate records of other mobile terminals that have a location change in VLRs 30. Switches 20 may be configured to send the one or more LOC CHG Records in one or more messages to LAS 50 via a network connection (e.g., an Internet Protocol (IP) connection). The physical medium (i.e., links 40) that connects switches 20 to LAS 50 may comprise landline or wireless physical media.

According to the illustrative embodiment, LAS 50 will have interfaces for receiving and sending messages. In one embodiment, LAS 50 may be configured to receive the one or more messages from switches 20 over the network connection. After receiving the one or more messages, LAS 50 may have one or more processors configured to extract the one or more LOC CHG Records from the one or more messages and populate Location Aggregation Database 60 with data from the one or more LOC CHG Records.

In another embodiment, LAS 50 may have one or more processors configured to generate query messages to be sent to switches 20 over the network connection. LAS 50 may send periodic query messages to switches 20 to verify a location of mobile terminals for which a change in location has not been received in a long time (i.e., the location information is stale). These periodic query messages allow LAS 50 to determine whether a) the mobile terminal is being stationary in the same place for a long time as the stale LOC CHG Record indicates or b) the mobile terminal has moved to a different location and LAS 50 did not receive a current LOC CHG Record. When the response to the periodic query message indicates that the mobile terminal is in the same place as the stale LOC CHG Record indicates, then LAS 50 may refrain from querying that mobile terminal so often because there is a high probability that the mobile terminal is stationary and will not be moving soon. So, LAS 50 may delay the frequency of the next periodic Location Update so that it is not querying a stationary mobile so often to prevent excess location queries in the network.

LAS 50 may be preferably embodied in one or more server apparatus, but may reside in one or more computing apparatus such as one or more mainframe computers or one or more soft switches or one or more processors or any combination of processors or computers configured to perform the functions described. In the exemplary embodiment, software running on LAS 50 facilitates the overall functionality of LAS 50 as well as the described functions.

Location Aggregation Database 60 may be configured to receive data from LAS 50 via link 45, store the data, and manage identifiers of mobile terminals and their associated location data. Illustratively, Location Aggregation Database 60 may be configured to store the following categories of data that may be contained in the LOC CHG Records: a) an identifier of the mobile terminal associated with each LOC CHG Record, b) multiple identifiers for the new location, c) a time stamp of when the mobile terminal location change occurred, d) an access technology associated with the new location, and e) an Activity type that indicates how the data was obtained.

According to the illustrative embodiment, the data stored in Location Aggregation Database 60 may be updated every time a mobile terminal's location is changed in VLRs 30 and LAS 50 receives a new LOC CHG Record from one or more of switches 20. Location Aggregation Database 60 may have a LOC/SAC Count Table that keeps count of the number of each device type in every location. When LAS 50 processes LOC CHG Records, counts in the LOC/SAC Count Table may be incremented or decremented as mobile terminals move into or out of a specific location. Also, counts may be kept based on periodic sampling (e.g., every minute) during a collection interval (e.g., every 15 minutes) that can be used to count average and peak number of mobile terminals in a collection interval.

Also, a snapshot of the LOC/SAC Count Table may be written to Location Measurement files on a collection interval basis (e.g., every 15 minutes). Location Measurement counts may include: the current number of mobile terminals, the peak number of mobile terminals during the interval, and an average number of mobile terminals during the interval. These Location Measurement files may then be collected over time and loaded into tools that can provide a statistical history/trend for the specified location over time. This historical information may be used by service providers for network capacity planning or sold for marketing purposes.

Location Aggregation Database 60 may be organized so that when information identifying a particular request is presented, the corresponding set of records may be retrieved. Illustratively, Location Aggregation Database 60 may be organized so that it may retrieve location specific records of the number of smart phones in a particular cell at a specific time or date for real-time targeted advertising. Also illustratively, Location Aggregation Database 60 may be organized so that it may retrieve location specific records of the number of mobile terminals in an area based on a brand name of each mobile terminal. Further illustratively, Location Aggregation Database 60 may be organized so that it may retrieve location specific records of the number of mobile terminals in an area that are users of UMTS and LTE for a service provider's network capacity planning purposes.

In the exemplary embodiment, Location Aggregation Database 60 is shown as a database external to LAS 50 that may be stored local to LAS 50, or remote therefrom. In another embodiment, Location Aggregation Database 60 may be integrated within LAS 50. Location Aggregation Database 60 may be available anytime LAS 50 is up and running as they are interdependent. Location Aggregation Database 60 may be embodied as an object oriented database or any other format that may be suitable for the necessary information retrieval, such as a relational database.

Service providers may be able to utilize Network Location Aggregation Management Console 70 to search Location Aggregation Database 60, display mobile terminal location information contained in Location Aggregation Database 60 on a map, or aggregate the mobile terminal location data into meaningful statistics (e.g., statistics that depict a status or state of a service provider's network). Also, third parties may be able to access Location Aggregation Database 60 via an application programming interface to search the stored information in Location Aggregation Database 60.

Figure 2:
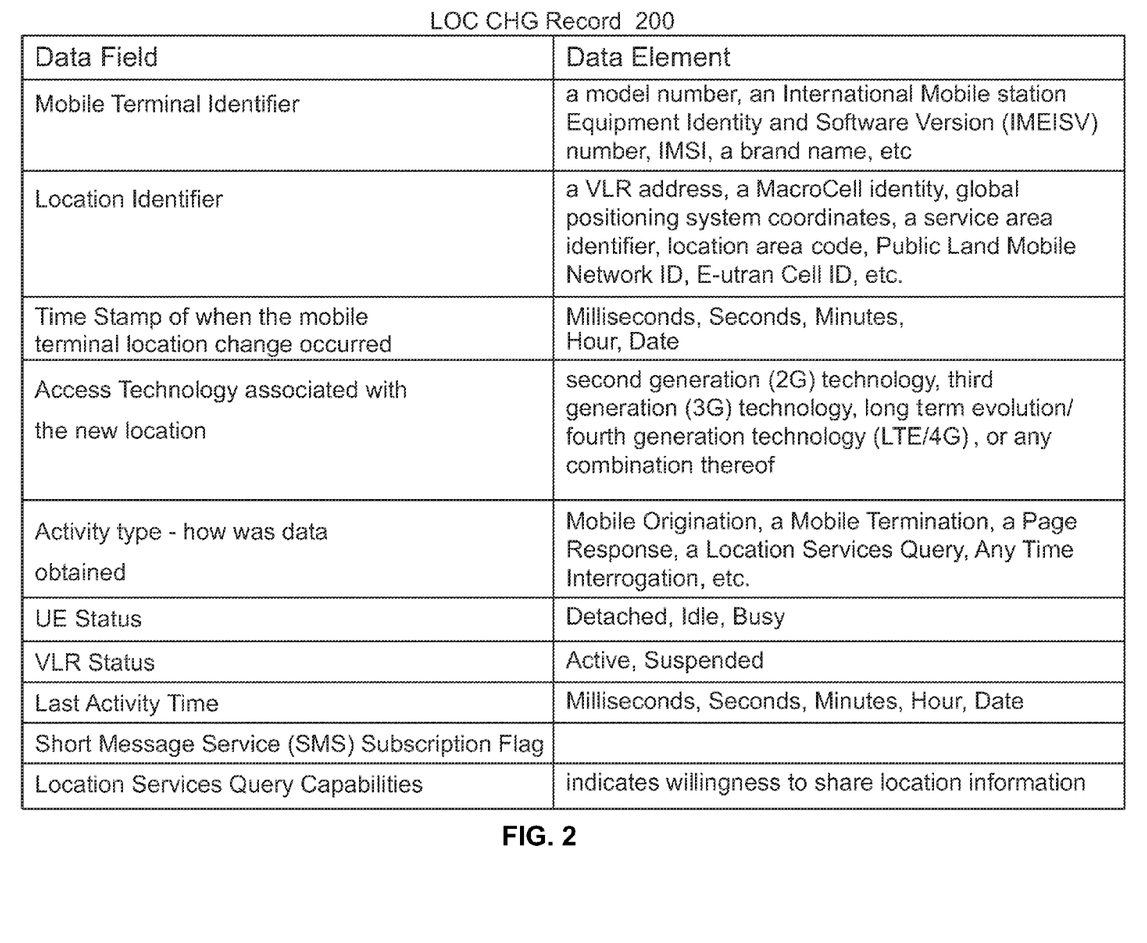
FIG. 2 shows an illustrative embodiment for a location change record arranged in accordance with the principles of the invention.

FIG. 2 shows an illustrative embodiment for a location change record (i.e., LOC CHG Record 200) arranged in accordance with the principles of the invention. The first column in FIG. 2 displays exemplary data fields in which data may be categorized in LOC CHG Record 200. The second column in FIG. 2 displays exemplary data elements contained in the LOC CHG Record 200. Illustratively, an example of a mobile terminal identifier may be an International Mobile station Equipment Identity and Software Version (IMEISV) number, which includes a Type Allocation Code (TAC), Serial Number, and Software Versions, where the Type Allocation Code identifies a particular model (and often revision) of wireless telephone for use on a GSM, UMTS or other IMEI-supporting wireless networks. LOC CHG Records may have a standardized format so that any switch manufactured by any vendor can create and send LOC CHG Records in messages to LAS 50. Thus, LAS 50 will be able to aggregate and process LOC CHG Records from multiple geographically dispersed network switches, and the multiple geographically dispersed network switches may be manufactured by different equipment vendors.

Figure 3:
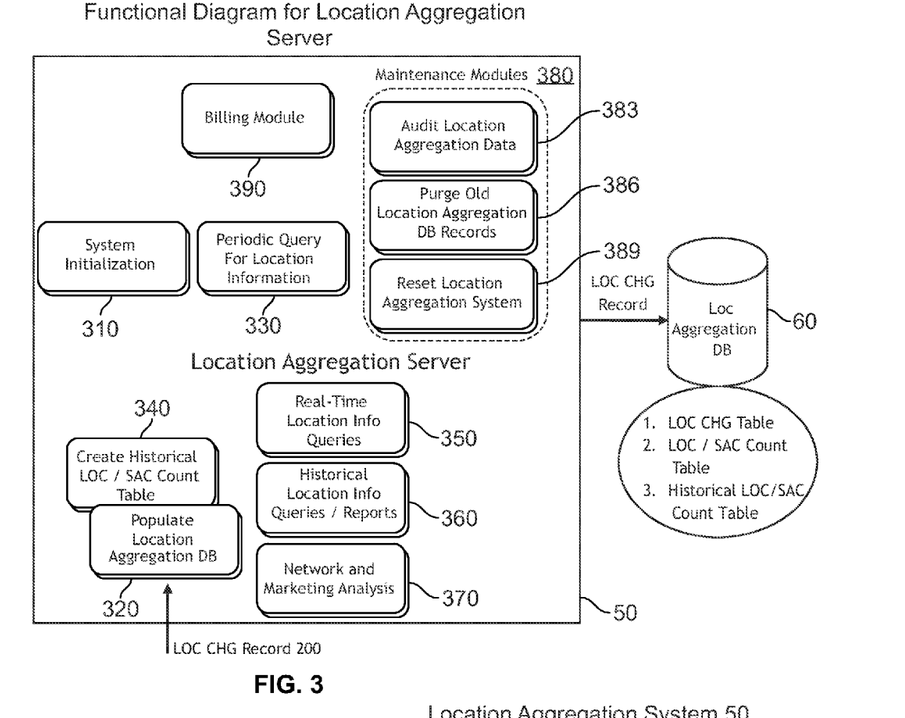
FIG. 3 shows an illustrative embodiment for an exemplary functional architecture of a Location Aggregation System arranged in accordance with the principles of the invention.

FIG. 3 shows an illustrative embodiment for an exemplary functional architecture of a Location Aggregation System arranged in accordance with the principles of the invention. In FIG. 3, like elements have been allocated like reference numerals. The various elements depicted in FIG. 3 may be implemented using any combination of hardware, software, or firmware using known techniques in accordance with the teachings herein. Also, the various elements illustrate an exemplary configuration and partition of functions. Furthermore, an exemplary component of FIG. 3 employs and/or comprises a set and/or series of computer instructions written in or implemented with any of a number of programming languages, as will be appreciated by those skilled in the art. As shown in FIG. 3, LAS 50 is composed of several modules that include:

System Initialization Module 310 which defines all system parameters and configuration data required to operate LAS 50. Such data might include but is not limited to: 1. Frequency of Periodic Location Updates if the mobile terminal location is stale (e.g., 15, 30, 45, 60 minute increments); 2. Delay Factor for Periodic Location Update generation (e.g., 15, 30, 45, 60 minute increments); 3. Maximum Threshold for Periodic Location generation (e.g., 60, 120, 180 minute increments); 4. Maximum Location Aggregation Database Size Threshold; 5. Desired Location Aggregation DB Size (used when deleting records when Location Aggregation Database size reaches the maximum size.); and 6. The list of network elements (e.g., MSCs, MMEs) allowed to send location data to LAS 50.

Populate Location Aggregation Database Module 320 which supports 1) populating Location Aggregation Database 60 with a LOC CHG Record as it is received from switches 20; and 2) updating the LOC/SAC Count Table in Location Aggregation Database 60 for the LOC/SAC/SAC_Range/Cell/E-utran Cell ID (ECI).

Periodic Query for Location Information Module 330 which supports periodic query messages sent to switches 20 to update a mobile terminal's location area when LAS 50 has not received a recent LOC CHG Record. The frequency of the periodic query messages is provisionable by a service provider (e.g., in 15, 30, 45, 60 minute increments). If the periodic query messages do not result in LAS 50 receiving a new LOC CHG Record for the mobile terminal subscriber, LAS 50 will delay the frequency of the next periodic Location Update by some delay factor until the maximum Periodic Location Generation Threshold is reached. This delay factor prevents excess location queries in the network if the mobile terminal is resident in the same LOC/SAC for an extended period of time.

Create Historical LOC/SAC Count Tables Module 340 which includes supporting the taking of a snapshot of the LOC/SAC Count Table every 15 minutes and a new Historical LOC/SAC Count Table is created that can be used for querying location information over a range of time/dates.

Real-Time Location Info Queries Module 350 which supports a query mechanism against Location Aggregation Database 60. Query options against the LOC/SAC Count Table may include: a) The number of mobile terminals in a SAC or a range of SACs for the latest reporting window; b) The number of mobile terminals in a LAC or a range of LACs for the latest reporting window; and c) The number of mobile terminals currently being served by a particular radio network controller/base station controller/MME. Query options against the LOC CHG Table might include: a) Location of a specific mobile; b) List of all mobile subscribers in a particular SAC; and c) List of all subscriber numbers in a particular LAC who are using a specific type of smart phone.

Historical Location Info Queries/Reports Module 360 supports location information queries and report creation using the Historical LOC/SAC Count Table data from Location Aggregation System Database 60. Examples of historical type queries/reports that may be supported include: a) The number of mobile terminals in a certain SAC or range of SACs over a time/date range; b) The number of mobile terminals in a certain LAC or range of LACs over a time/date range; c) A map of the number of mobile terminals to a geographical map by cell site coordinates in a particular time/date range; d) Query on mobile terminal demographics (e.g., Smart Phone vs. Basic Cell Phone, etc.) for a SAC/LAC or range of SACs/LACs over a time period; and e) The length of time mobile terminals are spending in a SAC/LAC.

Network and Marketing Analysis Module 370 which assists a service provider or a marketing department in the use of the historical location data collected in Location Aggregation Database 60 (i.e., Historical LOC/SAC Count Table) to make decisions related to network operations or target marketing. Illustrative analyses: 1. Based on historical usage (e.g., the number of mobile terminals in a SAC/LAC or range of SACs/LACs combined with the number of smart phones in those areas), would it be beneficial to add a Wireless Fidelity (Wi-Fi) based on IEEE 802.11 hot spot in the area to offload some traffic from the radio network? 2. Based on historical usage (e.g., the number of mobile terminals in SAC/LAC or range of SACs/LACs combined with the time of day and length of stay, would it make sense for the service provider to open a retail store in that area?

Maintenance Modules 380 which keep LAS 50 in perfect harmony with the location data that resides in VLRs 30. In addition, there are provisions to rebuild Location Aggregation Database 60 if the system experiences a hardware failure, a duplex failure, a system initialization, or any catastrophic event.

Audit Location Aggregation Data Module 383 which supports an audit of Location Aggregation Database 60. The audit module ensures that data is current and accurate between VLRs 30 and Location Aggregation Database 60.

Purge Old Location Aggregation Database Records Module 386 which supports a purge of out-dated LOC CHG Records and Historical LOC/SAC Count Table records so as not to cause overload conditions on LAS 50. Illustratively, when the size of Location Aggregation Database 60 reaches the maximum size Location Aggregation Database threshold, the oldest LOC CHG records and Historical LOC/SAC Count Table records are deleted until a desired size of Location Aggregation Database is reached. The Historical LOC/SAC Count Table records may be offloaded to files if a longer history needs to be maintained than what can be stored in Location Aggregation Database 60.

Reset Location Aggregation Database Module 389 which supports a rebuild of Location Aggregation Database 60 in the event of a loss of data in LAS 50 due to a hardware failure, a duplex failure, a system initialization, or any other catastrophic event that could potentially cause the loss of data in LAS 50. Illustratively, LAS 50 may send a "RESET" command (e.g., similar to a HLR Reset) to each of VLRs 30 that currently feeds LAS 50. Upon receipt of the "RESET" command from LAS 50, each of VLRs 30 that currently feeds LAS 50 creates a LOC CHG Record to send to LAS 50 on the next activity for each mobile terminal, regardless of whether the location information has changed since last reporting.

Billing Module 390 which produces a billing record, called a Location Query Billing Record, which may be used to bill an initiator of any location query messages against Location Aggregation Database 60. The Location Query Billing Record is a billing record that documents who requested what information from LAS 50 and when it was requested.

Figure 4:
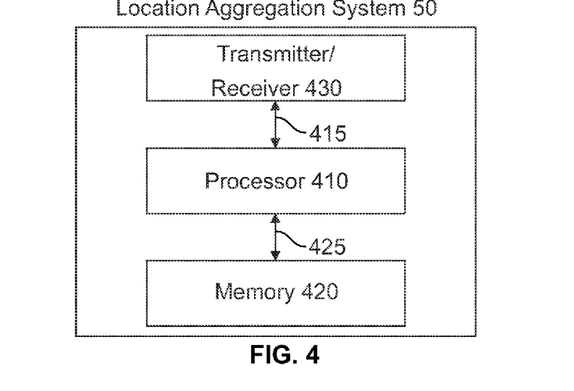
FIG. 4 shows another illustrative embodiment for an exemplary architecture of a Location Aggregation System arranged in accordance with the principles of the invention.

FIG. 4 shows another illustrative embodiment for an exemplary architecture of a Location Aggregation System arranged in accordance with the principles of the invention. As shown in FIG. 4, Location Aggregation System 50 comprises Processor 410 which connects to Memory 420, and to Transmitter/Receiver 430.

Processor 410 is configured to receive and process instructions and to perform functions necessary for LAS 50 to obtain and manage the LOC CHG Records. Specifically, Processor 410 may execute program logic to a) extract LOC CHG Records from messages received from switches 20, b) populate Location Aggregation Database 60 with the LOC CHG Records, c) increment/decrement the LOC/SAC Table located in Location Aggregation Database 60, d) generate periodic real-time query messages to switches 20 to request current LOC CHG Records of mobile terminals, e) generate messages to instruct switches 20 NLRs 30 to create a LOC CHG Record that switches 20 may send to LAS 50 on a next activity for each mobile terminal when data is loss, etc.

Processor 410 may be any type of processor capable of manipulating data and performing the functions described herein for LAS 50. Processor 410 should not be construed to refer exclusively to hardware capable of executing software, and may implicitly include, without limitation, digital signal processor (DSP) hardware, application specific integrated circuit (ASIC), field programmable gate array (FPGA), read only memory (ROM) for storing software, random access memory (RAM) for storing software, and non volatile storage. The functions of Processor 410 may be provided by a single dedicated processor, by a single shared processor, or by a plurality of individual processors, some of which may be shared.

Memory 420 may contain memory locations for storing information for Processor 410 and the instructions (e.g., aggregate LOC CHG Records from the received messages, populate Location Aggregation Database 60 with the LOC CHG Records) executed by Processor 410, including the software modules that facilitate the overall functionality of LAS 50. Processor 410 reads information and instructions from Memory 420, and writes information to Memory 420.

Memory 420 may be any type of component capable of storing information. Memory 420 may be embodied as random access memory (RAM), read only memory (ROM), magnetic disk drive storage media, optical storage media, flash memory drives, on-board memory included within Processor 410, Erasable Programmable ROM (EPROM), Electrically Erasable Programmable ROM (EEPROM), registers, or any combination thereof.

Transmitter/Receiver 430 are devices that may be used to access particular types of network elements (e.g., switches 20) with which LAS 50 wishes to communicate. Illustratively, Transmitter/Receiver 430 receives LOC CHG Records from switches 20 and forwards them to Processor 410 via bus 415. Also illustratively, Transmitter/Receiver 430 sends query messages generated by Processor 410 to switches 20. Transmitter/Receiver 430 may be implemented as a transceiver. An antenna, not shown, may be electronically coupled to Transmitter/Receiver 430.

A bus 425 is used for the exchange of information between Memory 420 and Processor 410. Also, a bus 415 is used for the exchange of information between Transmitter/Receiver 430 and Processor 410. Although only bus 415 and bus 425 are shown, there may be multiple buses, which may include a control signal bus, a data bus, a power bus, etc. The various buses are illustrated as bus 415 and bus 425 in order to simplify the description of the invention.

Advantageously, the methods according to the invention enable service providers to perform real-time analyses with mobile terminal location information. Also advantageously, harvesting and storing mobile terminal location information from across multiple switches may allow service providers to learn the demographics of their mobile subscriber population down to a very specific location area. Further advantageously, providing service providers with management tools to search, display on a map, or roll up this data into meaningful statistics is key to enabling service providers to offer the real-time location data to third parties, thus creating a new revenue stream. Further still advantageously, the Location Aggregation System will maintain the location of all mobile terminals through location change records produced during standard mobility management procedures and provide the means to target SMS delivery to any or all mobile terminals in a specified location.

Figure 5:
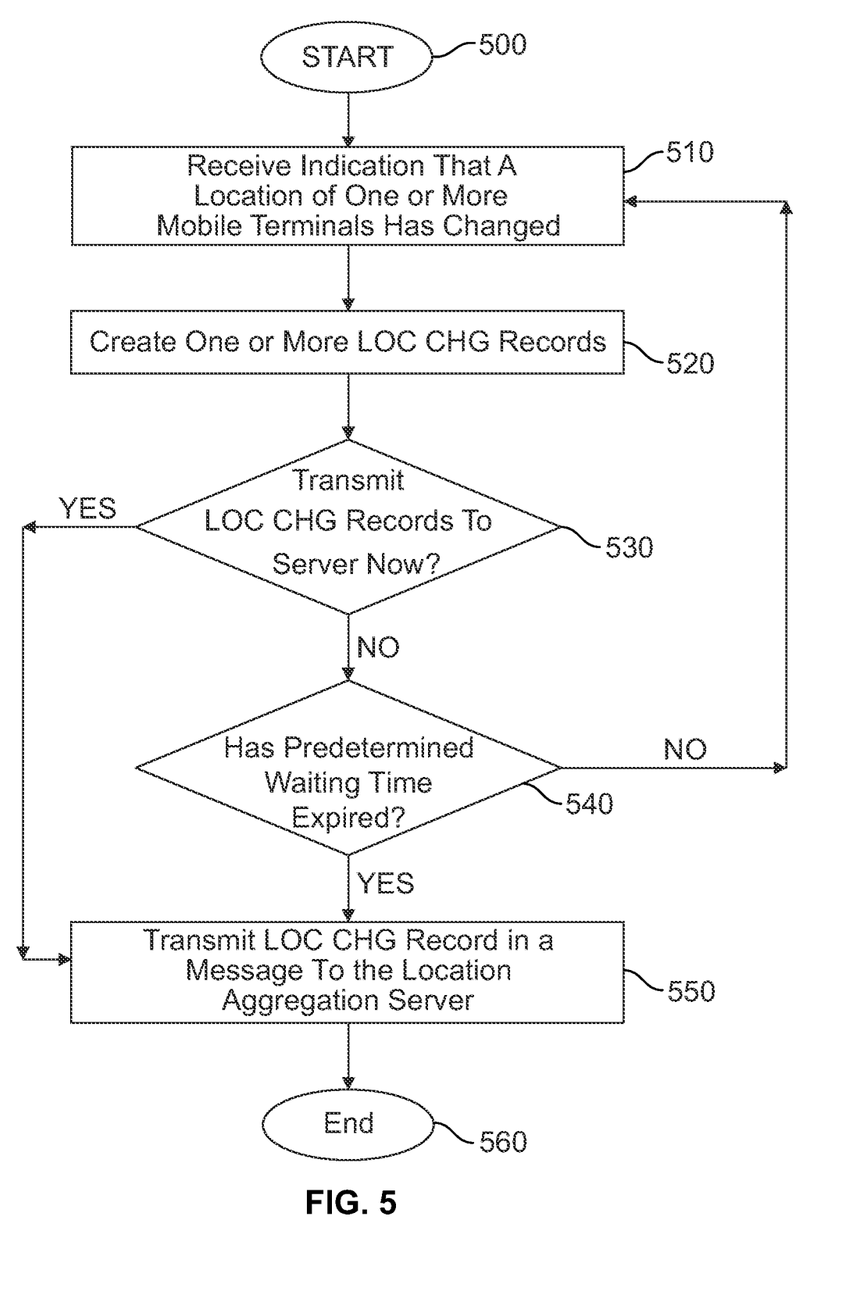
FIG. 5 shows an illustrative flow chart for an exemplary method of operating an embodiment of the invention arranged in accordance with the principles of the invention.

FIG. 5 shows an illustrative flow chart for an exemplary method of operating an embodiment of the invention arranged in accordance with the principles of the invention. FIG. 5 focuses on the operation of switches 20. The process begins in step 500 (FIG. 5).

In step 510 (FIG. 5), switches 20 (FIG. 1) receive an indication that a location of a mobile terminal has changed in VLRs 30 (FIG. 1). The indication may be a Mobile Origination message, a Mobile Termination message, a Mobile Attach/Detach message, a Location Update message, a Tracking Area Update message, a Page Response, a SMS message, a LCS Query, a CISS procedure, etc.

In step 520 (FIG. 5), one or more processors, not shown, within switches 20 (FIG. 1) execute program logic to create a LOC CHG Record 200 (FIG. 2) for each mobile terminal that has the location change in VLRs 30. The data contained in each LOC CHG Record 200 may include a) an identifier of the mobile terminal associated with each LOC CHG Record, b) multiple identifiers for the new location, c) a time stamp of when the mobile terminal location change occurred, d) an access technology associated with the new location, and e) an Activity type—how data was obtained, etc.

In step 530 (FIG. 5), the one or more processors, not shown, within switches 20 (FIG. 1) execute program logic to determine whether to transmit a message that contains the LOC CHG Record 200 (FIG. 2) in real-time (i.e., immediately) to LAS 50.

If the test result in step 530 (FIG. 5) is NO, indicating that switches 20 (FIG. 1) will not transmit the message that contains the LOC CHG Record 200 (FIG. 2) immediately, then control is passed to step 540.

In step 540 (FIG. 5), the one or more processors within switches 20 (FIG. 1) execute program logic to determine whether the predetermined waiting time for transmitting the message that contains the LOC CHG Record 200 (FIG. 2) has expired.

If the test result in step 540 (FIG. 5) is NO, indicating that the predetermined waiting time for transmitting the message that contains the LOC CHG Record 200 (FIG. 2) has not expired, then control is passed to step 510. Switches 20 (FIG. 1) will continue to wait during the predetermined waiting time in order to aggregate records of other mobile terminals that have changed locations.

If the test result in step 540 (FIG. 5) is YES, indicating that the predetermined waiting time for transmitting the message that contains the LOC CHG Record 200 (FIG. 2) has expired, then control is passed to step 550.

If the test result in step 530 (FIG. 5) is YES, indicating that switches 20 (FIG. 1) will transmit the message that contains the LOC CHG Record 200 (FIG. 2) immediately, then control is passed to step 550.

In step 550 (FIG. 5), switches 20 (FIG. 1) transmit the one or more LOC CHG Records 200 (FIG. 2) to LAS 50 (FIG. 1) in one or more messages via a network connection (e.g., an IP connection).

The process is exited in step 560.

Figure 6:
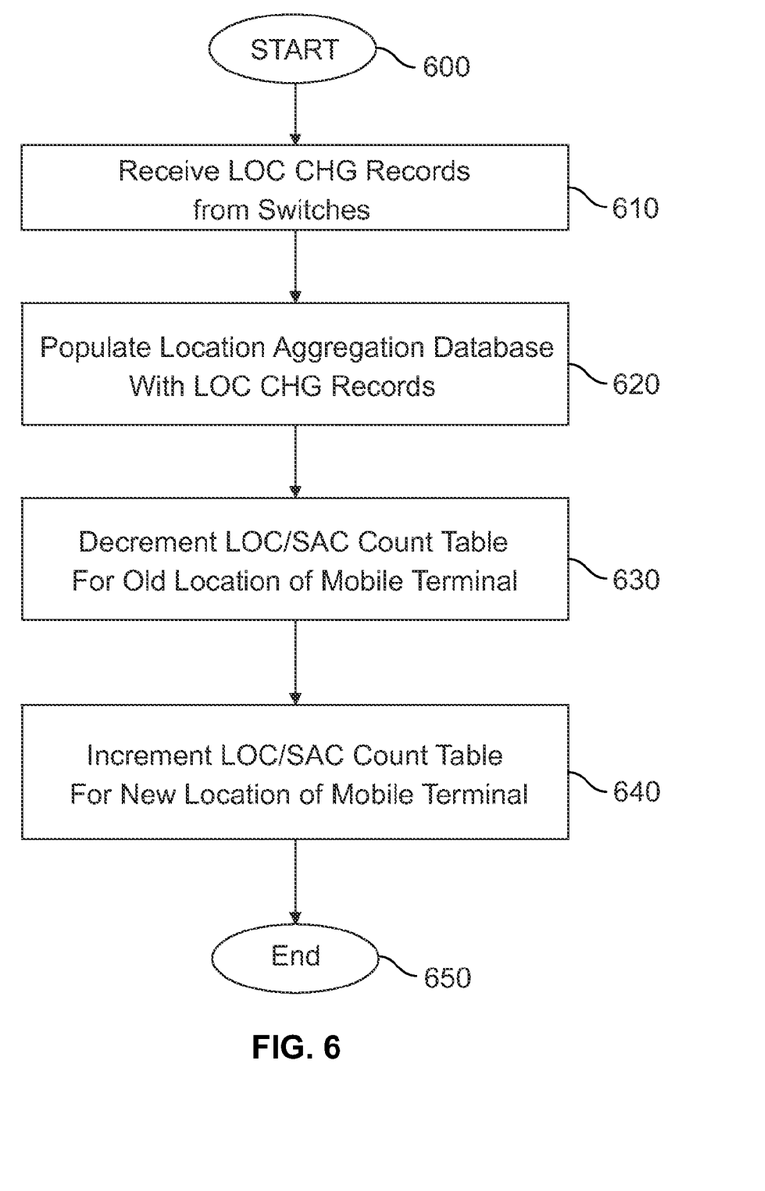
FIG. 6 shows another illustrative flow chart for an exemplary method of operating an embodiment of the invention arranged in accordance with the principles of the invention.

FIG. 6 shows another illustrative flow chart for an exemplary method of operating an embodiment of the invention arranged in accordance with the principles of the invention. FIG. 6 focuses on the operation of LAS 50. The process begins in step 600 (FIG. 6).

In step 610 (FIG. 6), Receiver 430 (FIG. 4) receives one or more messages from switches 20 (FIG. 1) that contain one or more LOC CHG Records (FIG. 2) via a network connection. The one or more LOC CHG Records describe a location change for one or more mobile terminals. Receiver 430 delivers the one or more messages to Processor 410 (FIG. 4) via bus 415.

In step 620 (FIG. 6), Processor 410 (FIG. 4) executes program logic to extract the one or more LOC CHG Records from the one or more messages and to populate Location Aggregation Database 60 (FIG. 1) with the one or more LOC CHG Records (FIG. 2).

In step 630 (FIG. 5), Processor 410 (FIG. 4) executes program logic to decrement LOC/SAC Count Table for old locations of the one or more mobile terminals.

In step 640 (FIG. 5), Processor 410 (FIG. 4) executes program logic to increment LOC/SAC Count Table for new locations of the one or more mobile terminals.

The process is exited in step 650.

Figure 7:
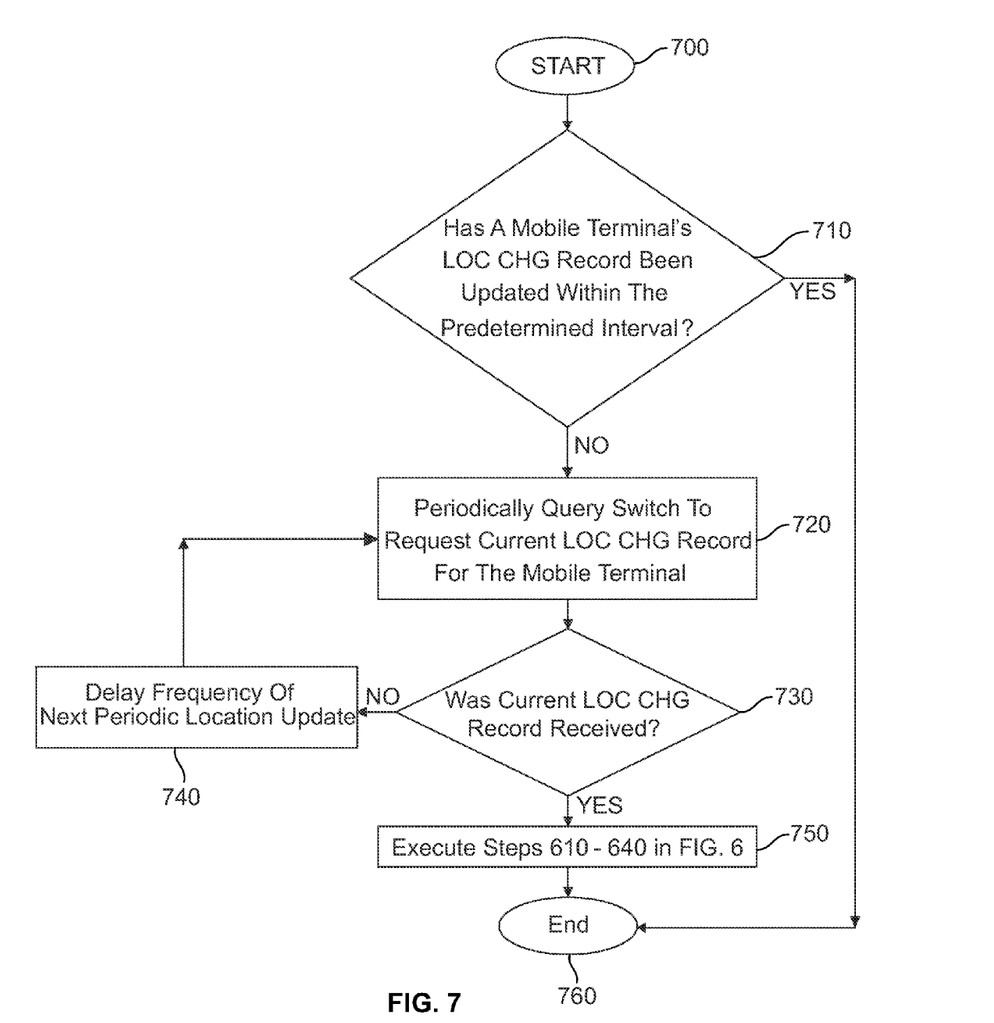
FIG. 7 shows yet another illustrative flow chart for an exemplary method of operating an embodiment of the invention arranged in accordance with the principles of the invention.

FIG. 7 shows yet another illustrative flow chart for an exemplary method of operating an embodiment of the invention arranged in accordance with the principles of the invention. FIG. 7 focuses on the operation of LAS 50. The process begins in step 700 (FIG. 7).

In step 710 (FIG. 7), Processor 410 (FIG. 4), executes program logic to determine whether the LOC CHG Record 200 (FIG. 2) for a mobile terminal has been updated within a predetermined interval set by the service provider. The predetermined interval may range from 15 to 60 minutes.

If the test result in step 710 (FIG. 7) is YES, indicating that the LOC CHG Record 200 (FIG. 2) for the mobile terminal has been updated within the predetermined interval, then control is passed to step 760.

If the test result in step 710 (FIG. 7) is NO, indicating that LOC CHG Record 200 (FIG. 2) for the mobile terminal has not been updated within the predetermined interval, then control is passed to step 720.

In step 720 (FIG. 7), LAS 50 (FIG. 1), Processor 410 (FIG. 4) executes program logic to send periodic query messages via Transmitter 430 (FIG. 4) to one of switches 20, e.g., MSC 20-1 (FIG. 1), to request the current LOC CHG Record 200 (FIG. 2) of the mobile terminal.

In step 730 (FIG. 7), Processor 410 (FIG. 4), executes program logic to determine whether the current LOC CHG Record 200 (FIG. 2) for the mobile terminal has been received after the periodic query.

If the test result in step 730 (FIG. 7) is NO, indicating that the current LOC CHG Record 200 (FIG. 2) for the mobile terminal has not been received after the periodic query (e.g., mobile terminal is stationary in the same location for a long time), then control is passed to step 740.

In step 740 (FIG. 7), Processor 410 (FIG. 4), executes program logic to delay the frequency of the next periodic location update.

If the test result in step 730 (FIG. 7) is YES, indicating that the current LOC CHG Record 200 (FIG. 2) for the mobile terminal has been received after the periodic query, then control is passed to step 750.

In step 750 (FIG. 7), Processor 410 (FIG. 4), executes program logic to perform the steps of FIG. 6 (e.g., populate Location Aggregation Database 60, etc.).

The process is exited in step 760.

The focus of this invention has been on the aggregation of mobile terminal (i.e., a mobile or handheld device that incorporates wireless voice communication capability as a standard function) location information across multiple network switches. However, a person of ordinary skill in the art will recognize that embodiments of the invention could be extended to include other data type devices, such as PDA devices, two-way pagers or digital video cameras that can access the Internet.

A person of ordinary skill in the art would readily recognize that steps of various above-described methods can be performed by programmed computers. Herein, some embodiments are intended to cover program storage devices, e.g., digital data storage media, which are machine or computer-readable and encode machine-executable or computer-executable programs of instructions where said instructions perform some or all of the steps of methods described herein. The program storage devices may be digital memories, magnetic storage media such as magnetic disks or tapes, hard drives, or optically readable digital data storage media. The embodiments are also intended to cover computers programmed to perform said steps of methods described herein.

The steps or operations described herein are intended as examples. There may be many variations to these steps or operations without departing from the spirit of the invention. For instance, the steps may be performed in a different order, or steps may be added, deleted, or modified.

The present invention may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The foregoing merely illustrates the embodiments of the invention. It will thus be appreciated that those skilled in the art will be able to devise various arrangements, which, although not explicitly described or shown herein, embody the principles of the invention, and are included within its spirit and scope.

What is claimed:

1. A method comprising:
    receiving, at a switch, an indication that a location of a mobile terminal has changed in a visitor location register;
    creating, at the switch from information stored at the visitor location register, a record that comprises an identifier of the mobile terminal and an identifier of a new location of the mobile terminal; and
    transmitting, at the switch, the record in a message to a server configured to increment a count of mobile terminals in a table contained in a database based on when received records indicate the mobile terminals have moved into a specific location and to decrement the count based on when other received records indicate the mobile terminals have moved out of the specific location.

2. The method of claim 1 wherein the record comprises the identifier of the mobile terminal, the identifier of the new location, and a time stamp that indicates when the location change occurred.

3. The method of claim 1 further comprising transmitting, at the switch, additional records associated with the mobile terminal to the server every time that the location of the mobile terminal changes in the visitor location register.

4. The method of claim 1 wherein the switch is selected from the group consisting of a mobile switching center, a Mobility Management Entity, and a Serving General Packet Radio Service Support Node.

5. The method of claim 2 wherein the identifier of the mobile terminal comprises an International Mobile station Equipment Identity and Software Version (IMEISV) number.

6. The method of claim 2 wherein the identifier of the new location is a location area code or a cell identification.

7. The method of claim 1 wherein the indication that the location of the mobile terminal has changed in the visitor location register is selected from the group consisting of a Mobile Origination message, a Mobile Termination message, a Location Update message, a short message service (SMS) origination/termination message, a Call Independent Supplementary Service (CISS) procedure and a Page Response.

8. A method comprising:
receiving, at a server, a message from a switch via a network connection;
populating, at the server, a database with data from the message, wherein the data comprises a record created at the switch from information stored at a visitor location register associated with the switch, and wherein the record describes a location of a mobile terminal that has changed in the visitor location register; and
updating, at the server, a table contained in the database, wherein the updating comprises incrementing a count of mobile terminals in the table based on when received records indicate the mobile terminals have moved into a specific location and decrementing the count based on when other received records indicate the mobile terminals have moved out of the specific location.

9. The method of claim 8 further comprising receiving, at the server, a proprietary message packaged at the visitor location register, wherein the proprietary message contains another record that describes the location change of the mobile terminal.

10. The method of claim 8 further comprising sending, at the server, periodic query messages to the switch to request a current location of the mobile terminal when the record has not been updated for a predetermined interval.

11. The method of claim 8 further comprising aggregating, at the server, records of other mobile terminals that have location changes in the visitor location register and other visitor location registers.

12. A server comprising:
a receiver configured to receive a message from a switch via a network connection; and
a processor connected to the receiver, the processor being configured to
populate a database with data from the message, wherein the data comprises a record created at the switch from information stored at a visitor location register associated with the switch, and wherein the record describes a location of a mobile terminal that has changed in the visitor location register;
increment a count of mobile terminals in a table contained in the database based on when received records indicate the mobile terminals have moved into a specific location; and
decrement the count based on when other received records indicate the mobile terminals have moved out of the specific location.

13. The server of claim 12, wherein the processor is configured to aggregate records of other mobile terminals that have location changes in the visitor location register and other visitor location registers.

14. The server of claim 13, further comprising a computer readable medium connected to the processor, wherein the computer readable medium contains instructions, that when executed by the processor, are adapted to cause the processor to aggregate the records of the other mobile terminals and to populate the database with the records.

15. The server of claim 12, further comprising a transmitter configured to send periodic query messages, generated by the processor, to the switch to request a current location of the mobile terminal when the record has not been updated for a predetermined interval.

16. The server of claim 15, wherein the transmitter is configured to send reset messages, generated by the processor, to each visitor location register that serves the server to request a new location change record for each mobile terminal when a failure occurs at the database.

17. The server of claim 12 wherein the receiver is configured to receive a proprietary message packaged at the visitor location register, and wherein the proprietary message contains another record that describes the location change of the mobile terminal.

18. The server of claim 12 wherein the record comprises an identifier of the mobile terminal and an identifier of the new location of the mobile terminal.

19. The server of claim 12, wherein the network connection is an Internet Protocol (IP) connection.

20. The server of claim 12, further comprising a management system configured to search the database, display mobile terminal location data from the database on a map, and aggregate the data into statistics that depict a status of a network.

21. The method of claim 8 further comprising aggregating, at the server, records of other mobile terminals that have location changes in other visitor location registers associated with geographically dispersed switches.

22. The method of claim 1 wherein a frequency in which the message and other messages that are transmitted to the server is adjustable.

* * * * *